(12) United States Patent
Alleau et al.

(10) Patent No.: US 8,740,140 B2
(45) Date of Patent: Jun. 3, 2014

(54) MULTIFUNCTIONAL ELECTROMECHANICAL DEVICE FOR LANDING GEAR

(75) Inventors: Jean-Luc Alleau, Orcemont (FR); Robert Kyle Schmidt, Charlton Kings (GB)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 347 days.

(21) Appl. No.: 13/132,158

(22) PCT Filed: Nov. 19, 2009

(86) PCT No.: PCT/FR2009/001327
§ 371 (c)(1),
(2), (4) Date: Jun. 1, 2011

(87) PCT Pub. No.: WO2010/063895
PCT Pub. Date: Jun. 10, 2010

(65) Prior Publication Data
US 2011/0233328 A1    Sep. 29, 2011

(30) Foreign Application Priority Data
Dec. 2, 2008   (FR) ...................................... 08 06755

(51) Int. Cl.
*B64C 25/10* (2006.01)
*B64C 25/40* (2006.01)

(52) U.S. Cl.
USPC .................................... 244/102 R; 244/103 S

(58) Field of Classification Search
USPC ....... 244/100 R, 102 R, 50, 103 R, 103 S, 74; 74/87.27–87.29
See application file for complete search history.

(56) References Cited

U.S. PATENT DOCUMENTS

| | | | |
|---|---|---|---|
| 1,524,352 A | | 1/1925 | Gephart |
| 1,812,143 A | * | 6/1931 | Dugan ............................ 244/50 |
| 2,320,547 A | * | 6/1943 | Tiger ......................... 244/103 S |
| 2,460,387 A | | 2/1949 | Hunter |
| 2,507,440 A | * | 5/1950 | Hanson .......................... 244/50 |
| 2,521,864 A | * | 9/1950 | Morse ....................... 244/102 R |
| 3,428,274 A | * | 2/1969 | Wally et al. ............... 244/103 R |
| 3,764,094 A | * | 10/1973 | Cross ............................. 244/50 |
| 8,474,748 B2 | * | 7/2013 | Cros et al. ...................... 244/50 |

FOREIGN PATENT DOCUMENTS

| | | |
|---|---|---|
| DE | 2050011 | 4/1971 |
| DE | 2162974 | 7/1972 |

* cited by examiner

*Primary Examiner* — Rob Swiatek
*Assistant Examiner* — Marc Burgess
(74) *Attorney, Agent, or Firm* — Sughrue Mion, PLLC

(57) ABSTRACT

A multifunction electromechanical device for an aircraft undercarriage. The device comprises a first shaft (10) mounted to rotate on the aircraft about an axis of rotation (R) that is substantially parallel to a hinge axis (X) of the undercarriage relative to the aircraft and a telescopic second shaft (20) mounted to rotate on the undercarriage extending downwards to the proximity of the wheels carried thereby. The device also includes a transmission (19) for transmitting rotary motion from the first shaft to the second shaft and a transmission (21) for transmitting rotary motion from the second shaft to at least one wheel carried by the undercarriage. With this configuration, if the wheel is not fitted with a brake, there is a specific brake (30) for braking one of the shafts relative to the undercarriage, and a motor (11, 15) for causing the first shaft to rotate.

4 Claims, 7 Drawing Sheets

MULTIFUNCTIONAL ELECTROMECHANICAL DEVICE FOR LANDING GEAR

CROSS-REFERENCE TO RELATED APPLICATIONS

This application is entitled to the benefit of and incorporates by reference in their entireties essential subject matter disclosed in International Application No. PCT/FR2009/001327 filed on Nov. 19, 2009, and French Patent Application No. 08/06755 filed on Dec. 2, 2008.

The invention relates to a multifunction electromechanical device for an undercarriage, and also to an undercarriage fitted therewith.

BACKGROUND OF THE INVENTION

Most undercarriages are hinged to an aircraft to move between a deployed position in which the undercarriage is supported by a side-brace member, and a folded position in which the undercarriage is received in a wheel bay of the aircraft. Undercarriages are known that include a raising actuator for raising the undercarriage into the wheel bay after takeoff. That actuator is generally in the form of a telescopic actuator.

The aircraft thus carries an actuator of non-negligible power, and thus presenting considerable weight, that is for use that is extremely brief, since it operates for no more than a few seconds during any one utilization cycle of the aircraft, i.e. while raising the undercarriage, and also while lowering it, essentially for the purpose of slowing down the downward movement of the undercarriage.

Proposals have also been made to fit at least one aircraft undercarriage with electric motors suitable for driving the wheels carried by the undercarriage so as to allow the aircraft to taxi independently without having recourse to thrust from its jets, thereby saving fuel.

Nevertheless, that equipment represents additional weight, which weight is also located in the vicinity of the wheels and thus at the end of the undercarriage, thereby increasing its inertia and contributing to increasing the forces involved in setting the wheels into rotation and the resilient return force to which the undercarriage is subjected on touching down.

OBJECT OF THE INVENTION

An object of the invention is to provide a single device that serves both to raise the undercarriage and to drive the wheels, thereby making it possible to avoid the above-mentioned drawbacks.

BRIEF DESCRIPTION OF THE INVENTION

In order to achieve this object, the invention provides a multifunction electromechanical device for an aircraft undercarriage, the device comprising:

a first shaft mounted to rotate on the aircraft about an axis of rotation that is substantially parallel to a hinge axis of the undercarriage relative to the aircraft;

a telescopic second shaft mounted to rotate on the undercarriage extending down therealong to the proximity of the wheels carried thereby;

transmission means for transmitting rotary motion from the first shaft to the second shaft;

transmission means for transmitting rotary motion from the second shaft to at least one wheel carried by the undercarriage;

if the wheel is not fitted with a brake, specific brake means for braking one of the shafts relative to the undercarriage; and motor means for causing the first shaft to rotate.

The device of the invention makes it possible to perform the following functions:

before landing, while the undercarriage is in the wheel bay, one or other of the shafts is braked, either by braking the wheel or by using the brake means. Braking one of the shafts causes the first shaft to oppose rotation relative to the undercarriage, thereby tending to drive the motor in rotation when the undercarriage is unlocked and starts its downwards movement towards the deployed position. The lowering of the undercarriage may be controlled by controlling the forced rotation of the motor, e.g. by making it deliver electricity to a resistance;

immediately prior to landing, while the undercarriage is in its deployed position and stabilized by the side-brace member: the electric motor is activated, thereby enabling the first shaft to be driven in rotation together with the second shaft and also the associated wheel. As a result, the wheel rotates before touchdown, and the forces required to set the wheel into rotation and the resilient return force to which the undercarriage is subjected are correspondingly diminished;

during braking: the rotation of the wheels causes the shafts to rotate and thus rotates the electric motor, which operates as a generator. The energy as recovered in this way can be stored in an electricity storage device, or it may be consumed in a dissipater device in order to slow down the motor and contribute to braking the wheel;

while taxiing, the electric motor can be used to rotate the wheel and thus contributes to moving the aircraft on the airport without calling on the jets of the aircraft; and after takeoff, one or other of the shafts is braked, either by using the wheel brake if the wheel has one, or by using the brake means. Braking one of the shafts causes the first shaft to resist rotation when the electric motor attempts to rotate it, and thus by reaction causes a torque to be generated on the undercarriage about its own hinge axis, thereby tending to raise the undercarriage towards its stored position.

Thus, the device of the invention serves simultaneously to actuate raising and lowering of the undercarriage, to actuate setting its wheels into rotation, to drive movement of the aircraft on the ground, and also to provide assistance in braking and energy recovery during braking. Thus, the device of the invention is used to a much greater extent than is a conventional actuator for raising and lowering the undercarriage, and it provides functions relating to rotating the wheel, at the cost of a simple telescopic shaft and of a transmission for imparting motion to the wheel, thus avoiding any need to place a specific motor in the wheel.

BRIEF DESCRIPTION OF THE FIGURES

The invention can be better understood in the light of the following description of the figures of the accompanying drawings, in which.

DETAILED DESCRIPTION OF THE INVENTION

Figure 1:
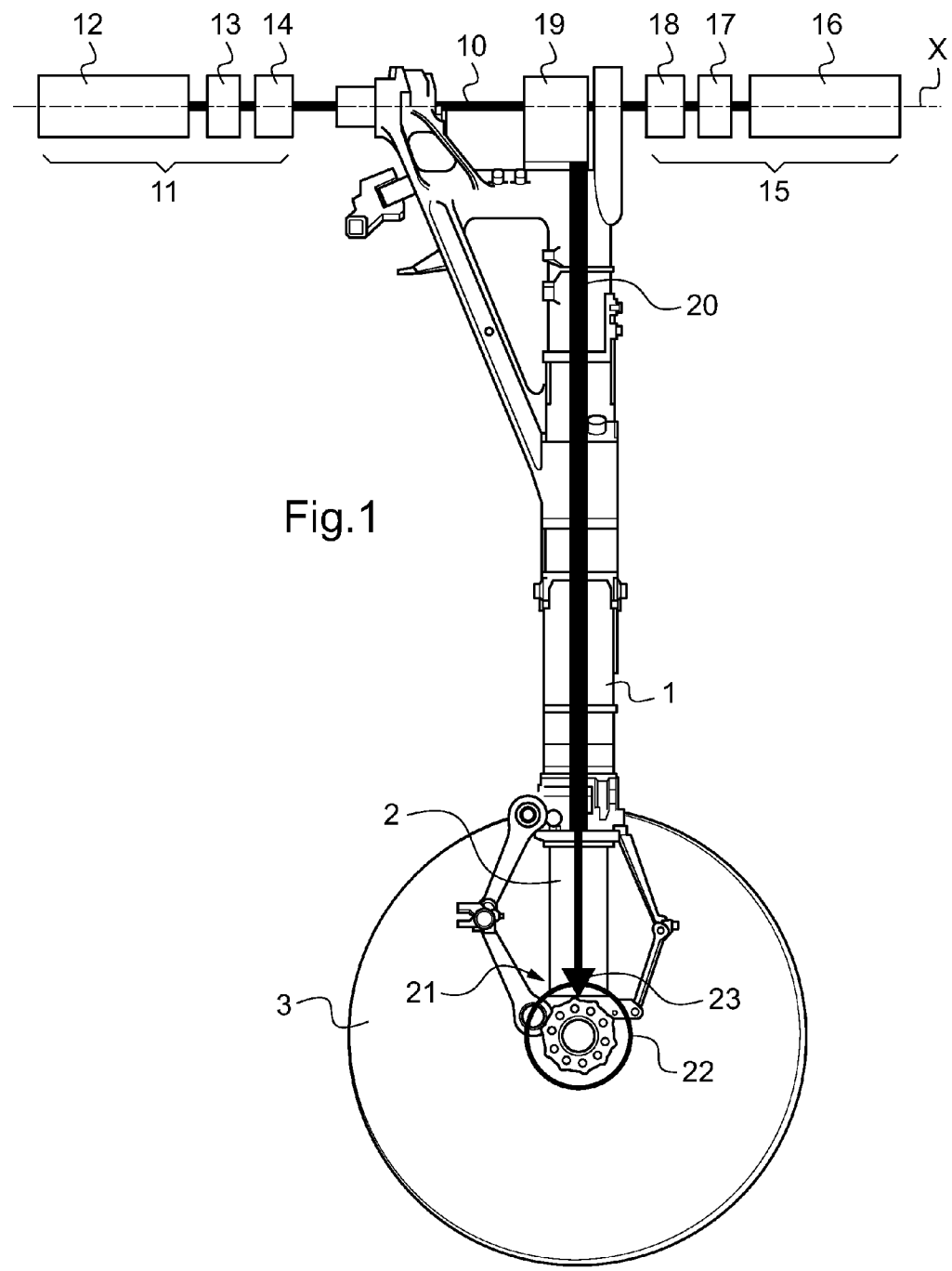
FIG. 1 is a diagrammatic side view of a main undercarriage of an aircraft, showing the installation of a multifunction device in a particular embodiment of the invention.
Figure 2:
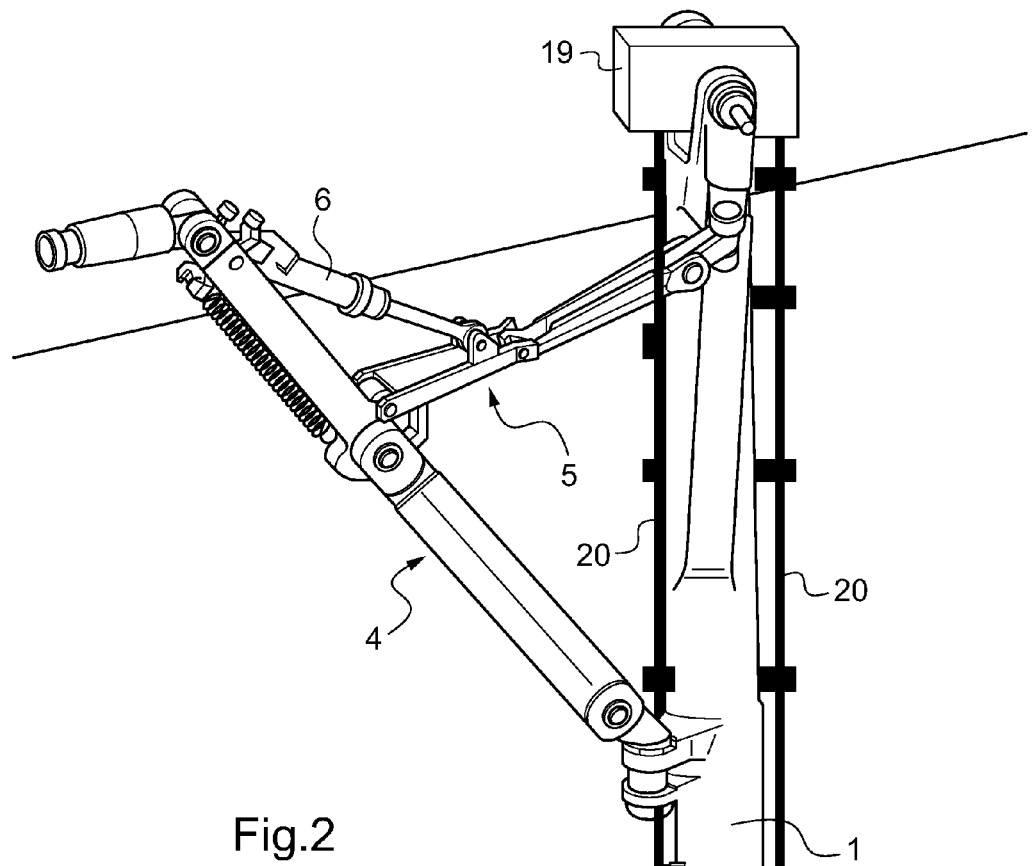
FIG. 2 is a face view of the FIG. 1 undercarriage, the drive means being omitted for greater clarity.

With reference to FIGS. 1 and 2, the device of the invention applies to a conventional undercarriage comprising a strut 1 hinged to the structure of an aircraft about a hinge axis X, and having a sliding rod 2 mounted to slide telescopically therein. The sliding rod forms a portion of an internal shock absorber, and at its end it carries an axle that carries two wheels 3 in this example (one of the wheels 3 is omitted from FIG. 1 for greater clarity). The undercarriage is shown in its deployed position in which it is stabilized by a foldable side-brace 4. The foldable side-brace 4 is itself stabilized in its in-line position shown here by a locking member 5 that locks automatically when the undercarriage is coming into its deployed position, and that is provided with an unlocking actuator 6 so as to allow the side-brace to be unlocked, and thus allow the undercarriage to be raised towards its stowage position in the well. This is all conventional and it is recalled merely for information purposes.

The multifunction device of the invention comprises firstly a first shaft 10 mounted to rotate on the structure of the aircraft about an axis of rotation R that extends substantially parallel to the hinge axis X of the undercarriage. Specifically, in this example, the axes X and R coincide. However the axis of rotation R could be distinct from the hinge axis X of the strut 1. The first shaft 10 is associated with a first motor unit 11 comprising an electric motor 12 fitted with a gearbox 13 and a clutch 14 enabling the first motor unit 11 to be secured to or separated from the first shaft 10. The first shaft 10 is associated with a second motor unit 15 comprising an electric motor 16 fitted with a gearbox 17 and a clutch 18 serving to secure the second motor unit 15 to the first shaft 10, or to separate it therefrom.

The first shaft 10 is associated with a first transmission gearbox 19 for constraining the first shaft 10 to rotate with a telescopic second shaft 20 that extends down along the undercarriage from said angle takeoff 19 to a second transmission gearbox 21 secured to the sliding rod 2 and situated close to one of the wheels 3, which second transmission gearbox serves to constrain the telescopic second shaft 20 to rotate with said wheel. For this purposes, the wheel is fitted with a toothed wheel 22 that co-operates with a matching gearwheel 23 mounted at the end of the telescopic portion of the second shaft 20.

The second shaft 20 is naturally telescopic in order to accommodate the variations in the length of the undercarriage as a result of the aircraft bearing against the ground via its landing gear, thereby tending to compress the shock absorber and cause the sliding rod 2 to be retracted into the strut 1.

The two motor units 11 and 15 may be used together when a high level of power is needed, or sequentially, e.g. in alternation, thereby leading to substantially equal amounts of wear on both motor units.

As can be seen more particularly in FIG. 2, it is possible to install two second shafts 20, each of which is associated with one of the wheels. The first transmission gearbox 19 then advantageously contains a differential gear.

Figure 3:
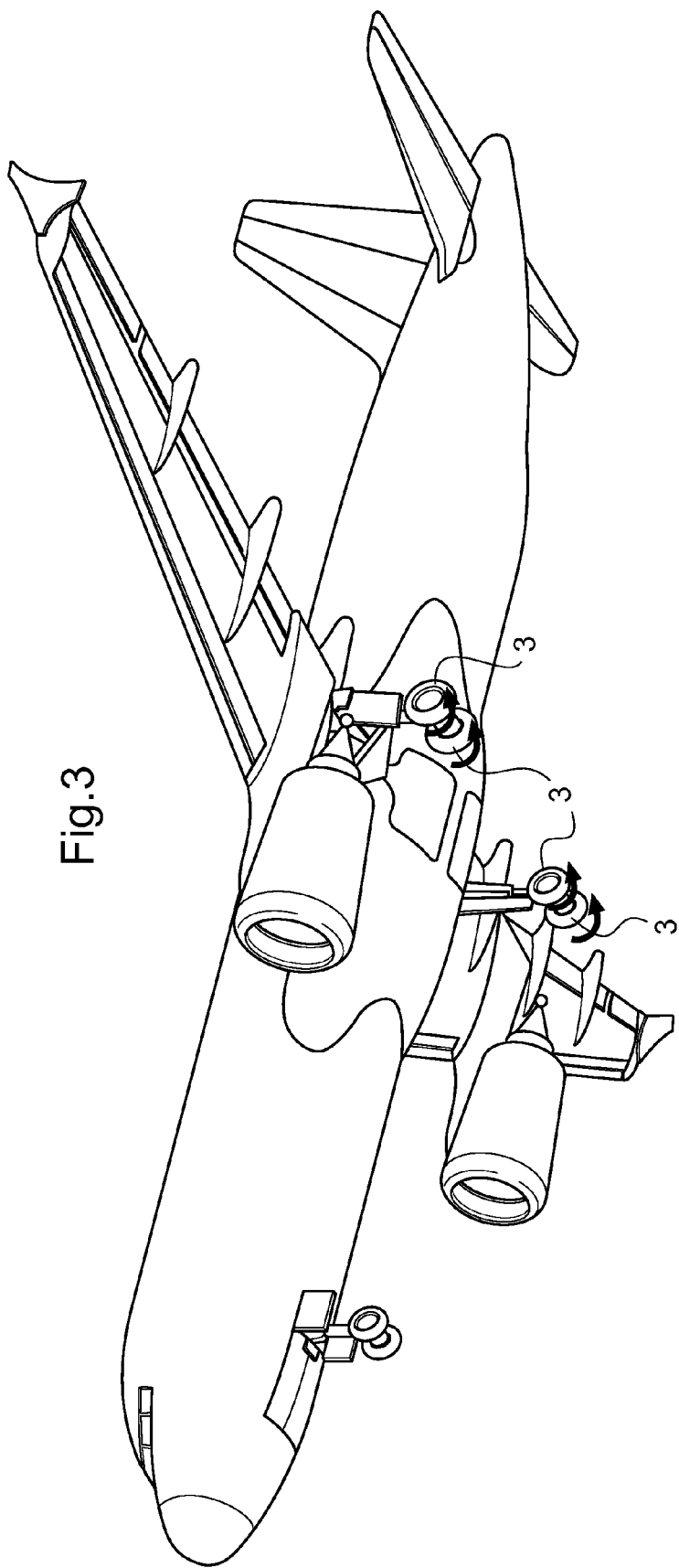
FIG. 3 is a fragmentary perspective view of an aircraft showing the use of the device to set the associated wheel into rotation while in flight.

The device as described serves to perform several functions. Thus, immediately before landing, while the undercarriage is in its deployed position as shown in FIG. 3, it is possible, by operating one of the motor units (low power suffices), to cause the wheels 3 associated with the device of the invention to be set into rotation while in flight, which rotation is represented by bold arrows. On touchdown, rotation of the wheels contributes to reducing the forces involved in setting them into rotation and reducing the resilient return force to which the undercarriage is subjected when stationary wheels are set into rotation.

Figure 4:
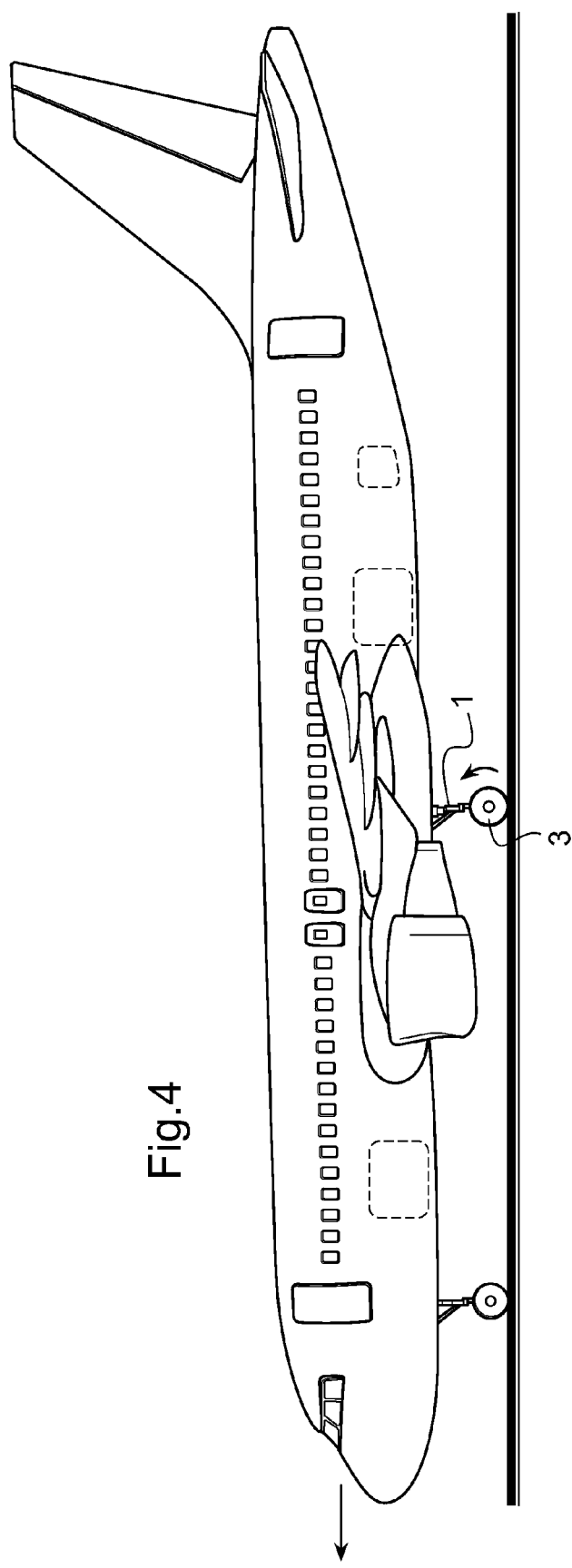
FIG. 4 is a side view of the aircraft while braking during a landing.

Thereafter, when the aircraft begins braking after touchdown, as shown in FIG. 4, the rotation of the wheels is transmitted by the shafts 20, 10 to the motor units 11, 15, whose motors are then driven mechanically and operate as generators. It is then possible either to recover the energy as produced in this way and store it in storage devices (batteries, capacitors, . . . ), or else to dissipate this energy, e.g. by means of a resistance so as to enable the motors to oppose rotation and thereby contribute to wheel braking, in concert with the action of the brake that is simultaneously braking the wheel.

Figure 5:
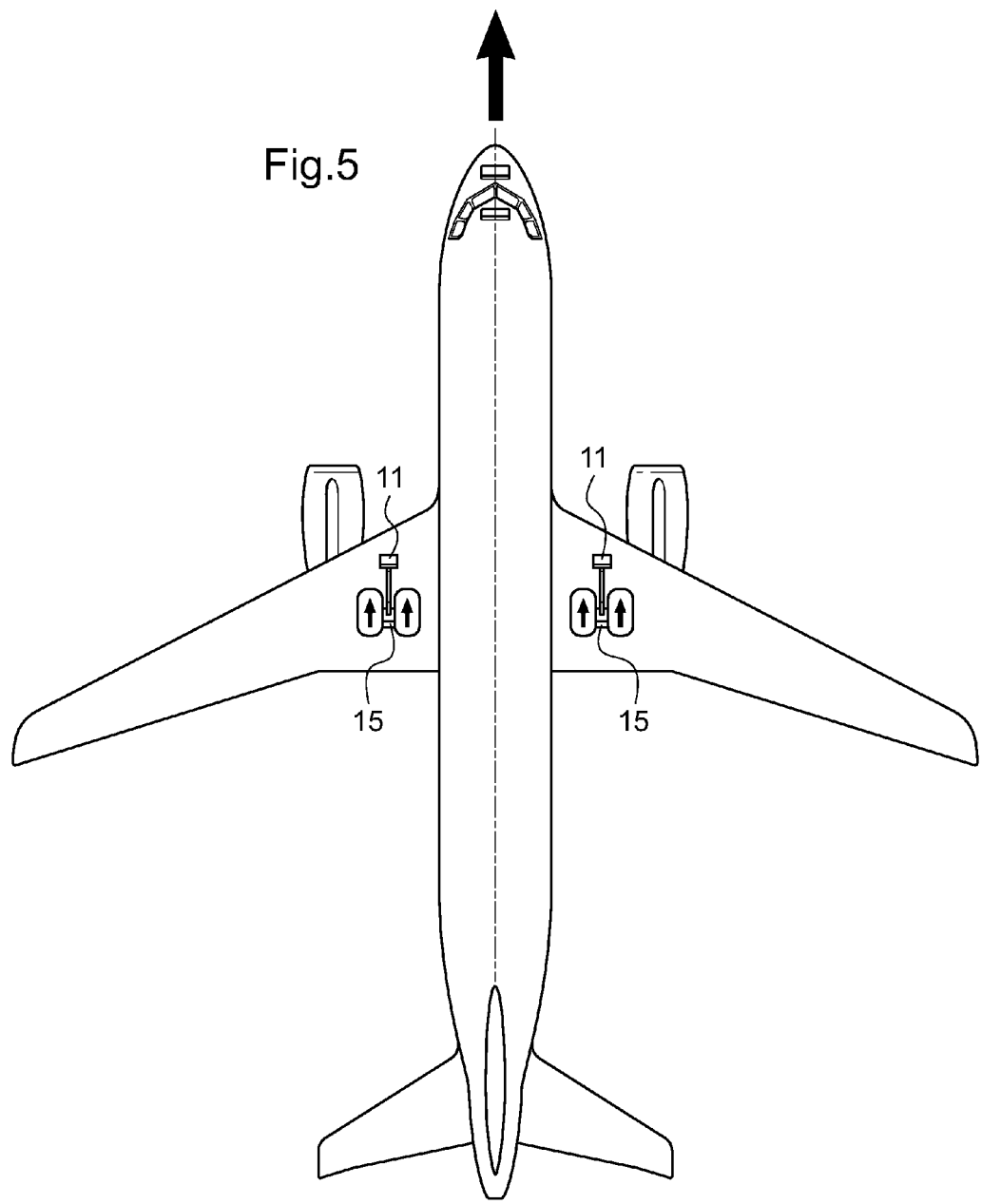
FIG. 5 is a diagrammatic plan view of the aircraft while taxiing by means of the device of the invention.

Thereafter, when the aircraft has finished braking, it is possible to move the aircraft by causing the motor units 11, 15 of the two main undercarriages to operate so as to turn the associated wheels, as represented symbolically in FIG. 5. Naturally, the similar device that is fitted to the other main undercarriage is implemented in like manner to turn the wheel associated with the other undercarriage. Identical commands applied to both devices thus causes the associated wheels to turn on each of the main undercarriages, thereby contributing to making the aircraft advance in a straight line. Differential commands, whereby the wheels of one of the undercarriages are caused to turn more quickly than the wheels of the other undercarriage, contribute to assisting the aircraft in steering, in combination with a steering command acting on the nose-wheels.

Those are various functions that can be implemented by the device of the invention concerning rotation of the associated wheel. However the device of the invention may also serve to move the undercarriage between its deployed position and its stowed position, thereby replacing the traditional undercarriage-raising actuators.

Figure 6:
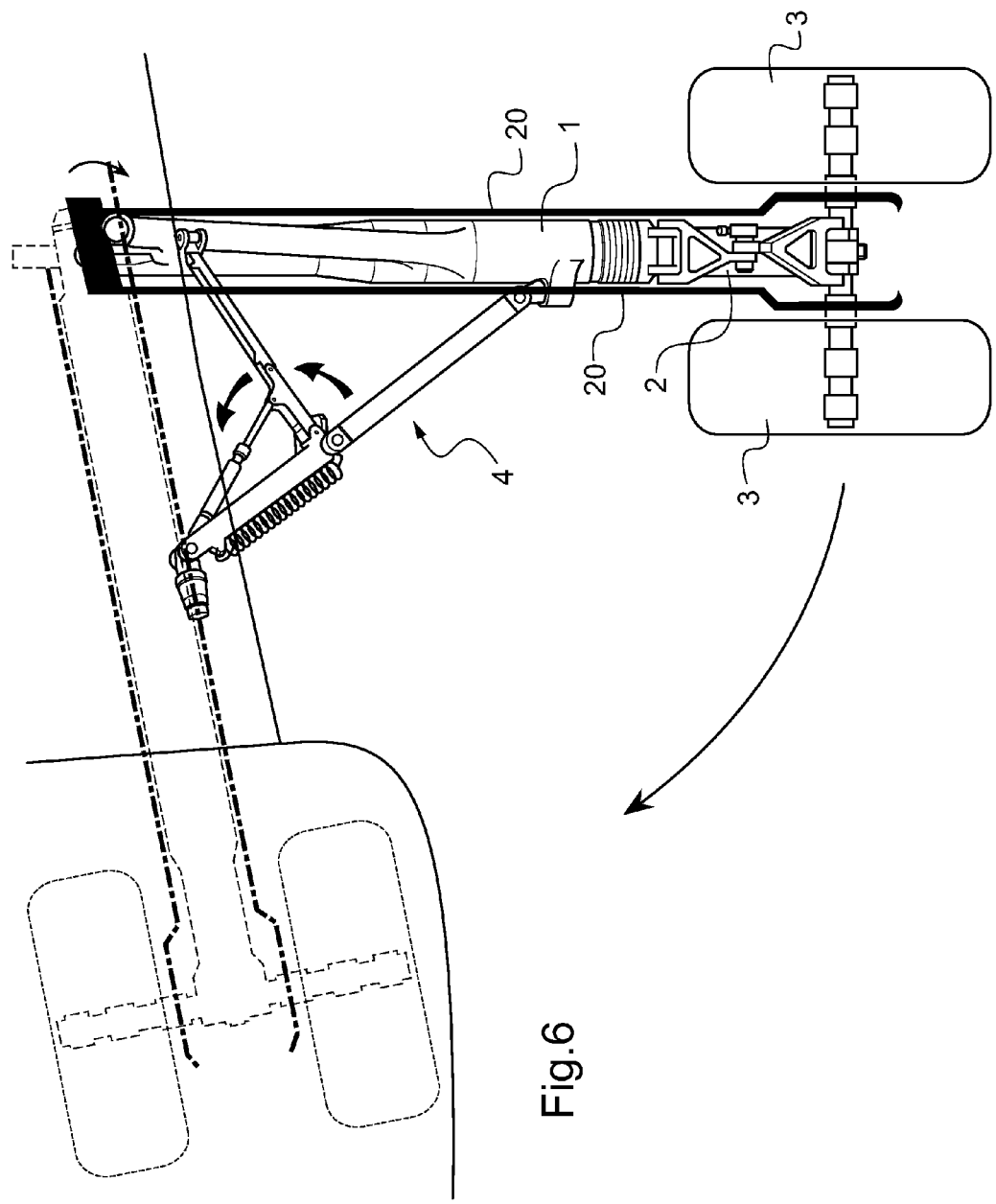
FIG. 6 is a face view of the undercarriage while it is being raised towards its stowed position.

Thus, and as shown in FIG. 6, it is possible to use the device of the invention to raise the undercarriage towards its stowage position. To do this, it is appropriate for the side-brace 4 to be unlocked and taken out of alignment so as to allow the undercarriage to be raised. Thereafter, it is appropriate to brake the wheels 3, using the brakes fitted thereto. Preventing the wheels from rotating prevents the second shaft 20 from rotating and thus prevents the first shaft 10 from rotating relative to the undercarriage. If the first shaft 10 is then driven to rotate (in the appropriate direction) by the motor units 11, 15, then torque is generated on the undercarriage about the hinge axis X, thereby tending to raise the undercarriage towards its stowage position. It is then possible to cause the undercarriage to rise up to its stowage position in which the undercarriage is conventionally retained by a hook that holds the undercarriage in its stowed position. In a variant, it is possible to hold the undercarriage in a blocked position by preventing the first shaft 10 from rotating relative to the structure of the aircraft, e.g. by means of a member for preventing at least one of the motor units from rotating. Such a provision makes it possible to omit the hook for retaining the undercarriage in the stowed position.

In order to lower the undercarriage, it suffices to release it, either by opening the hook, or by releasing the first shaft 10 relative to the aircraft. The undercarriage is thus free to deploy under the effect of gravity. The device of the invention may then be used either to slow down the speed at which the undercarriage drops, or to contribute actively to making it move downwards, e.g. to confirm that the undercarriage is indeed in its deployed position and to guarantee that the side-brace locks automatically.

In both situations, the wheels are braked, thereby preventing the two second shafts 20 from rotating and also preventing the first shaft 10 from rotating relative to the undercarriage. The natural lowering of the undercarriage under the effect of gravity thus causes the first shaft 10 to rotate relative to the structure of the aircraft, and thereby drives the motors of the motor units in rotation. It then suffices to control the rotation of the motors in order to slow down and thus control the lowering of the undercarriage, so as to prevent it reaching its deployed position at a speed that is too great. The rotation of the motors may be controlled simply by causing them to deliver electricity to a resistance or by any other device suitable for creating electromagnetic torque and that tends to oppose the forced rotation of the motor under the effect of the first shaft 10 rotating, thereby having the effect of slowing down the lowering of the undercarriage. In contrast, at the end of the stroke, the motors of the motor units 11, 15 should be powered so as to exert a confirming moment on the first shaft 10 that urges the undercarriage into its deployed position.

Thus, using a single device, it becomes possible to perform several functions, such as moving the undercarriages, recovering braking energy, and moving the aircraft without having recourse to its jets. The motors of the device are thus advantageously used during stages of landing, of the aircraft taxiing on the ground, and of takeoff.

The invention is naturally not limited to the above description, but on the contrary covers any variant coming within the ambit defined by the claims.

Figure 7:
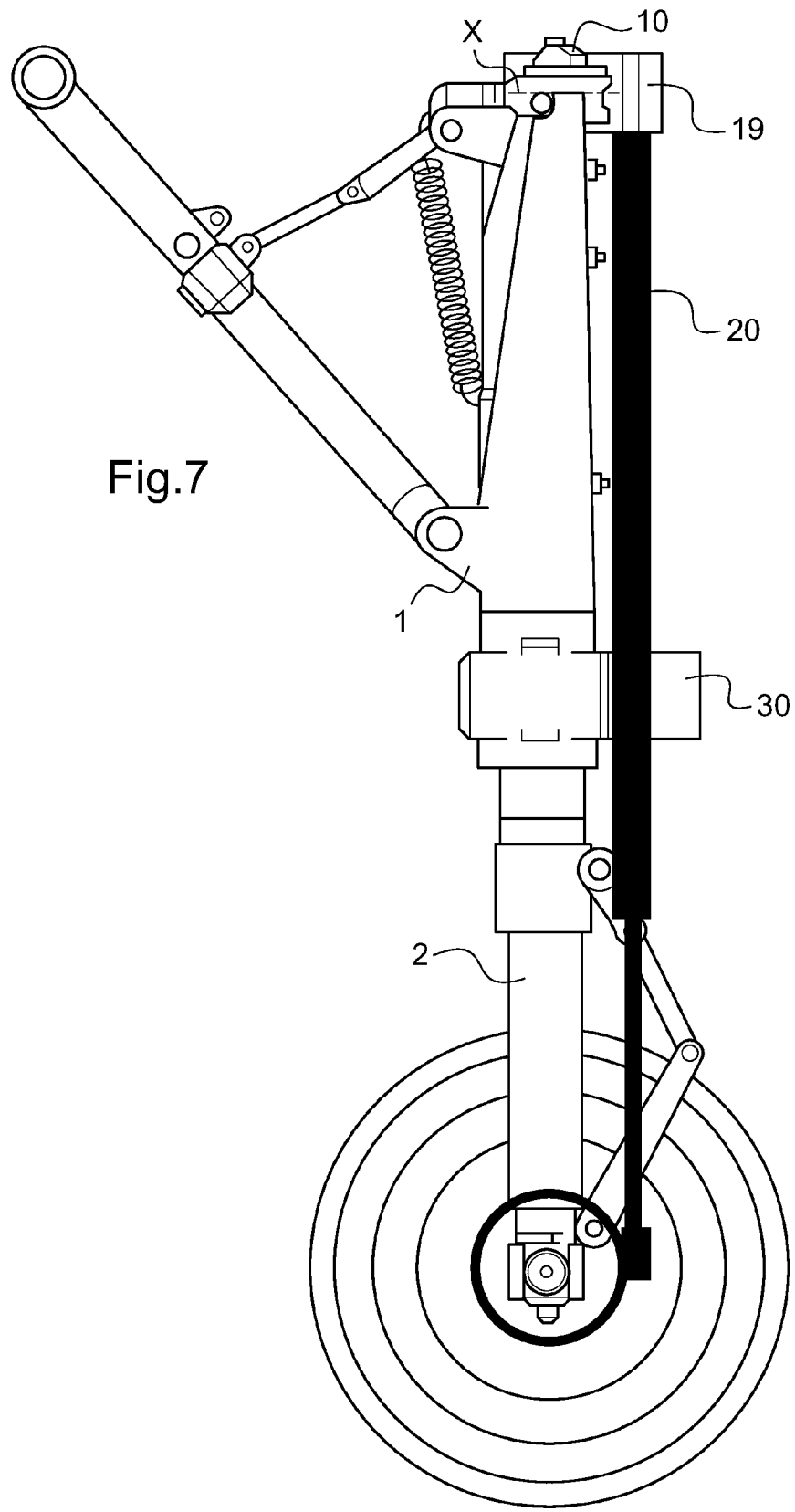
FIG. 7 is a side view of a nose-wheel undercarriage fitted with a device of the invention.

In particular, the device of the invention may be applied to an undercarriage having wheels that do not include any brakes, such as a nose-wheel undercarriage. In order to brake the rotation of the shafts relative to the undercarriage, and as shown in FIG. 7, it is then appropriate to provide specific brake means 30 for braking one of the shafts (here a second shaft 20) that are suitable, in controlled manner, for allowing the shafts and the associated wheels to rotate, or on the contrary for braking or indeed preventing rotation of those elements, thereby contributing in the same manner as in the example described, to generating a torque in reaction about the hinge axis of the undercarriage when one or other of the motor units is operated. It should be observed at this point that the first shaft 10 coincides with the hinge axis X of the undercarriage.

It is then possible to provide a duplicated multifunction device, with each of the wheels including a respective telescopic second shaft, a first shaft, and a corresponding motor unit. Thus, each wheel can be controlled independently of the other, and it is thus possible to impart different speeds of rotation thereto, which can assist in steering the undercarriage wheels of the aircraft. Where appropriate, it is possible to eliminate the traditional steering control fitted to the nose-wheel undercarriage, with that control being replaced by the duplicated device of the invention that also serves, as explained, when the aircraft is taxiing on the ground, during braking, and when moving the nose-wheel undercarriage between its deployed position and its stowed position.

In addition, it is clear that it is possible for the device of the invention to be fitted with only one motor unit, instead of the two shown, with the motor unit possibly being fitted with a plurality of motors, where appropriate. Provision may also be made for gearboxes that vary transmission ratios between the motor unit(s) and the first shaft so as to enable power transmission to be modulated.

Furthermore, the motor means may be electrical, hydraulic, or based on any other technology, provided they are capable of operating both as generators and as motors.

Finally, although the devices shown are associated with the two wheels carried by the undercarriage rod, it is possible for the device to be associated with only one of the wheels. Under such circumstances, the device would have only one telescopic second shaft.

What is claimed is:

1. A method of raising an aircraft undercarriage fitted with a multifunction electromechanical device from a deployed position to a stowed position, said multifunction electromechanical device comprising at least:
   a first shaft mounted to rotate on the aircraft about an axis of rotation that is substantially parallel to a hinge axis of the undercarriage relative to the aircraft;
   a telescopic second shaft mounted to rotate on the undercarriage extending down therealong to the proximity of the wheels carried thereby;
   transmission means for transmitting rotary motion from the first shaft to the telescopic second shaft;
   transmission means for transmitting rotary motion from the telescopic second shaft to at least one wheel carried by the undercarriage;
   a wheel brake fitted to the wheel; and
   motor means for causing the first shaft to rotate;
   the method comprising the following steps:
   (1) unlocking a side-brace member of the undercarriage;
   (2) preventing the second shaft of the multifunction electromechanical device from rotating relative to the undercarriage, by actuating the wheel brake; and
   (3) operating the motor means to cause the first shaft to rotate relative to the structure of the aircraft.

2. A method of lowering an aircraft undercarriage fitted with a multifunction electromechanical device from a stowed position to a deployed position, said multifunction electromechanical device comprising at least:
   a first shaft mounted to rotate on the aircraft about an axis of rotation that is substantially parallel to a hinge axis of the undercarriage relative to the aircraft;
   a telescopic second shaft mounted to rotate on the undercarriage extending down therealong to the proximity of the wheels carried thereby;
   transmission means for transmitting rotary motion from the first shaft to the telescopic second shaft;
   transmission means for transmitting rotary motion from the telescopic second shaft to at least one wheel carried by the undercarriage;
   a wheel brake fitted to the wheel and
   motor means for causing the first shaft to rotate;
   the method comprising the steps of:
   (1) releasing the undercarriage to allow it to be lowered;
   (2) preventing the second shaft of the multifunction electromechanical device from rotating relative to the undercarriage, by actuating the wheel brake; and
   (3) controlling the forced rotation of the motor means as induced by the lowering of the undercarriage so as to control the lowering of the undercarriage.

3. A method of raising an aircraft undercarriage fitted with a multifunction electromechanical device from a deployed position to a stowed position, said multifunction electromechanical device comprising at least:

a first shaft mounted to rotate on the aircraft about an axis of rotation that is substantially parallel to a hinge axis of the undercarriage relative to the aircraft;

a telescopic second shaft mounted to rotate on the undercarriage extending down therealong to the proximity of the wheels carried thereby;

transmission means for transmitting rotary motion from the first shaft to the telescopic second shaft;

transmission means for transmitting rotary motion from the telescopic second shaft to at least one wheel carried by the undercarriage;

a specific brake means for braking the second shaft; and motor means for causing the first shaft to rotate; the method comprising the following steps:
(1) unlocking a side-brace member of the undercarriage;
(2) preventing the second shaft of the multifunction electromechanical device from rotating relative to the undercarriage, by actuating the specific brake means; and
(3) operating the motor means to cause the first shaft to rotate relative to the structure of the aircraft.

4. A method of lowering an aircraft undercarriage fitted with a multifunction electromechanical device from a stowed position to a deployed position, said multifunction electromechanical device comprising at least:

a first shaft mounted to rotate on the aircraft about an axis of rotation that is substantially parallel to a hinge axis of the undercarriage relative to the aircraft;

a telescopic second shaft mounted to rotate on the undercarriage extending down therealong to the proximity of the wheels carried thereby;

transmission means for transmitting rotary motion from the first shaft to the telescopic second shaft;

transmission means for transmitting rotary motion from the telescopic second shaft to at least one wheel carried by the undercarriage;

a specific brake means for braking the second shaft; and motor means for causing the first shaft to rotate; the method comprising the steps of:
(1) releasing the undercarriage to allow it to be lowered;
(2) preventing the second shaft of the multifunction electromechanical device from rotating relative to the undercarriage, by actuating the specific brake means; and
(3) controlling the forced rotation of the motor means as induced by the lowering of the undercarriage so as to control the lowering of the undercarriage.

* * * * *